No. 628,739. Patented July 11, 1899.
E. BAINES.
PRIMARY BATTERY.
(Application filed Dec. 29, 1897.)
(No Model.)
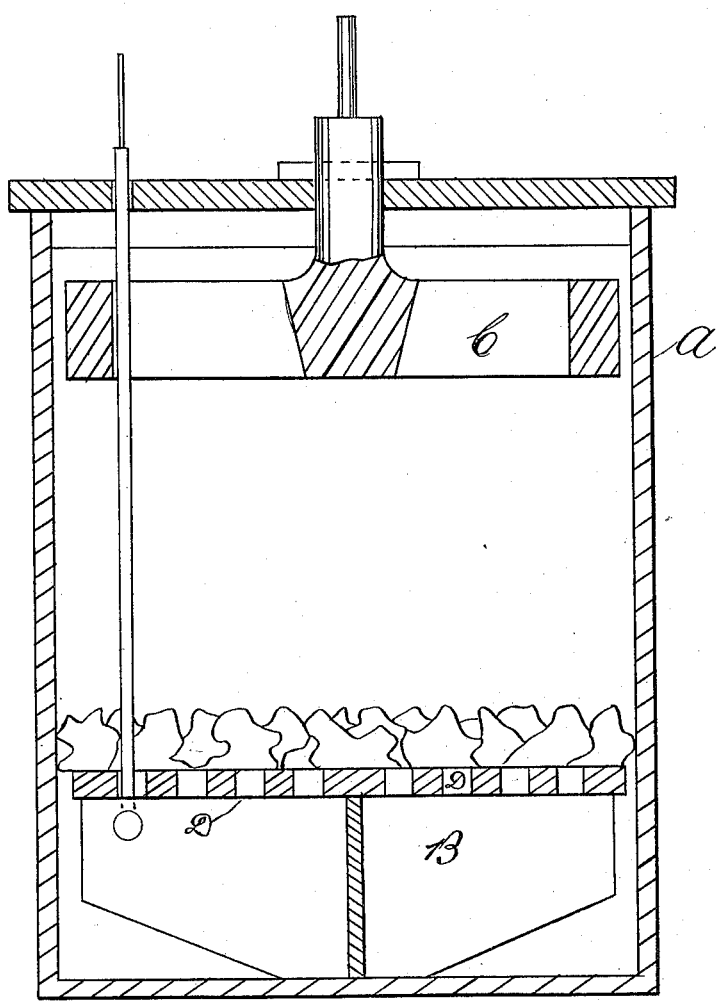
Witnesses
John S. Maralius, Jr.
E. W. Blodgett
Inventor
Edward Baines

United States Patent Office.

EDWARD BAINES, OF NEW YORK, N. Y., ASSIGNOR TO WILLIAM C. CALLMANN AND CHARLES A. STERN, OF SAME PLACE.

PRIMARY BATTERY.

SPECIFICATION forming part of Letters Patent No. 628,739, dated July 11, 1899.

Application filed December 29, 1897. Serial No. 664,320. (No model.)

*To all whom it may concern:*

Be it known that I, EDWARD BAINES, a subject of the Queen of Great Britain, residing at New York, (Brooklyn,) in the county of Kings, in the State of New York, have invented certain new and useful Improvements in Primary Electric Generating-Batteries, of which the following is a specification.

My invention relates to that class of primary batteries known as the "gravity-battery."

The object of my invention is to produce a primary electric generating-battery in which the negative electrode shall be in a clear solution of copper sulfate and out of contact with the crystals of copper sulfate used to maintain the strength of current in the battery and to make use of electric current passing from the positive electrode to the negative electrode to decompose the crystals of copper sulfate.

To obtain the object of my invention, I add to the ordinary gravity-battery now in use a perforated plate or grid, and this plate I locate between the electrodes in the battery, and upon this grid I place the crystals of copper sulfate used in the battery, and I completely cover the upper side of the perforated plate or grid with crystals of copper sulfate, so that current can pass from the positive electrode to the negative electrode by way of the interstices between the crystals of copper sulfate only—that is, I completely cover the upper side of the grid D with crystals of copper sulfate to the depth of one inch or thereabout.

In the anexed drawing, which forms part of this specification, A is a jar or containing vessel.

B is the negative electrode of copper and in the form of a deep star or spiral and in a solution of copper sulfate.

C is the positive electrode of zinc and in a solution of zinc sulfate.

D is the grid or perforated plate and constitutes the addition which I make to the ordinary gravity-battery, and it is by means of this grid that I obtain the object of my invention, and upon the upper side of this grid I place the crystals of copper sulfate which are used to keep the battery in action.

All of the parts of my battery are set up and arranged as shown in my drawing and as set forth in this specification.

The grid D, I prefer making of such material as cannot be plated with copper, such as porcelain or pottery; but this grid may be made of metal, and it may form part of the negative electrode without in any way interfering with my invention.

I do not make any claim to a battery in which the negative electrode consists of a plate of copper or other electronegative material set in a horizontal position in the battery or to a battery in which the crystals of copper sulfate are contained in a porous or perforated receptacle.

What I claim as my invention is—

In a primary electric generating-battery of the gravity type a negative electrode B of electronegative material located in the lower part of a jar A and in a solution of copper sulfate and having a positive electrode of zinc C located in the upper part of the jar A and in a solution of zinc sulfate, a grid D of nonmetallic material located between the electrodes B and C; and crystals of copper sulfate located on the upper side of the grid D, and occupying the whole of the sectional area of the jar A.

EDWARD BAINES.

Witnesses:
M. E. KANE,
MARGARET CLEARY.